US008393992B2

(12) United States Patent
Uchida (10) Patent No.: US 8,393,992 B2
(45) Date of Patent: Mar. 12, 2013

(54) VEHICLE DIFFERENTIAL GEAR

(75) Inventor: Hiroyuki Uchida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 226 days.

(21) Appl. No.: 13/016,206

(22) Filed: Jan. 28, 2011

(65) Prior Publication Data

US 2011/0190091 A1 Aug. 4, 2011

(30) Foreign Application Priority Data

Feb. 3, 2010 (JP) ................................. 2010-022288

(51) Int. Cl.
*F16H 48/30* (2012.01)
(52) U.S. Cl. ....................................................... 475/237
(58) Field of Classification Search .................. None
See application file for complete search history.

(56) References Cited

U.S. PATENT DOCUMENTS

| 4,555,962 | A | * | 12/1985 | Bucarelli | 475/86 |
| 6,007,449 | A | * | 12/1999 | Okada et al. | 475/231 |
| 6,820,712 | B2 | * | 11/2004 | Nakamura | 180/249 |
| 6,935,982 | B2 | * | 8/2005 | Handa et al. | 475/231 |
| 7,758,462 | B2 | * | 7/2010 | Veldman et al. | 475/231 |
| 7,951,038 | B2 | * | 5/2011 | Ina et al. | 475/231 |
| 8,057,347 | B2 | * | 11/2011 | Chiba et al. | 475/200 |
| 8,152,672 | B2 | * | 4/2012 | King et al. | 475/84 |

FOREIGN PATENT DOCUMENTS

JP 2008-267561 A 11/2008

* cited by examiner

*Primary Examiner* — Dirk Wright
(74) *Attorney, Agent, or Firm* — Birch, Stewart, Kolasch & Birch, LLP (57) ABSTRACT

To prevent a differential lock status during operation, in a differential gear with a differential lock. A locking piece which rotates along with rotation of a differential case is attached to the differential case. A contact piece contactable with the locking piece is formed in a fork member that moves a lock pin to set the differential lock status. When the number of revolutions of the differential case becomes a predetermined number of revolutions, the locking piece moves to a position facing the contact piece, to regulate actuation of the fork member. Accordingly, the differential mechanism section is prevented from entry into the differential lock status.

20 Claims, 9 Drawing Sheets

VEHICLE DIFFERENTIAL GEAR

CROSS-REFERENCE TO RELATED APPLICATIONS

The present application claims priority under 35 USC 119 to Japanese Patent Application No. 2010-022288 filed on Feb. 3, 2010 the entire contents of which are hereby incorporated by reference.

BACKGROUND OF THE INVENTION

1. Field of the Invention

The present invention relates to a vehicle differential gear having a mechanism to lock a differential operation (differential lock).

2. Description of Background Art

A differential gear is a device to absorb a difference in the number of revolutions between left and right driving wheels upon turning of a vehicle to allocate driving torque to the respective driving wheels while generating a number of revolutions corresponding to the respective vehicle wheels.

Some differential gears have a mechanism to lock a differential operation (differential lock). The differential lock temporarily stops a differential operation of the differential gear to uniformly transmit driving torque to left and right wheels unconditionally. The differential lock typically functions when one of the left and right wheels slips on a road with a small friction coefficient such as a sloppy road and the vehicle cannot escape. In a four-wheel vehicle, a vehicle operating on uneven land and the like, the differential lock is often adopted as a differential gear with a limited-slip differential mechanism. For example, JP-A No. 2008-267561 discloses a differential gear having a limited slip differential mechanism and a differential lock.

In a differential gear with a differential lock as disclosed in the JP-A No. 2008-267561, when the vehicle enters a differential lock status during high speed operation, as a heavy load is applied on the lock mechanism, it is necessary to fortify the lock mechanism. This enlarges the entire device and increases the weight.

SUMMARY AND OBJECTS OF THE INVENTION

According to an embodiment of the present invention, a vehicle differential gear is provided with a differential lock in which a differential lock status upon operation is prevented.

As a solution of the above problem, according to an embodiment of the present invention, a vehicle differential gear including a ring gear 48 is engaged with a pinion gear 35 provided on a propeller shaft (e.g. a front propeller shaft 25 in the embodiment). A differential case 49 is attached to a side surface of the ring gear for forming a differential mechanism chamber (e.g. an accommodation space S2 in the embodiment). A differential mechanism (e.g. a differential mechanism section 50 in the embodiment) is accommodated in the differential case with a side gear (e.g. left output side cam 69, right output side cam 70) engaged with the differential mechanism that transmits a driving force from the propeller shaft via left and right driven shafts (e.g. front axles 31L and 31R in the embodiment) to vehicle wheels (e.g. front wheels FW in the embodiment). A lock pin 66 is inserted through the differential case into a pin hole 75 formed in the side gear to stop a differential operation of the differential mechanism to set a differential lock status. An operation member (e.g. a fork member 77 in the embodiment) is provided for operating the lock pin, a boss (e.g. a boss 64 in the embodiment) that is integrally formed to insert the driven shaft through the ring gear or the differential case. An annular member 65 is provided in the boss which is slidable along an axial direction of the boss, and is provided with the lock pin therein. A locking piece 84 that rotates along with the rotation of the ring gear or the differential case is attached to the ring gear or the differential case. A contact piece 85 is contactable with the locking piece and is formed in the operation member. When a number of revolutions of the ring gear or the differential case becomes a predetermined number of revolutions, the locking piece moves to a position facing the contact piece to regulate actuation of the operation member.

According to an embodiment of the present invention, the differential lock status during operation can be prevented.

Note that in the embodiment of the present invention, the format of the differential mechanism is not particularly limited, but it has a concept including any format such as a structure with a limited slip differential mechanism or a general structure or so-called open differential lock. In the embodiment of the present invention, a medium interlocked with the differential mechanism to transmit a driving force is referred to as a side gear. The side gear is a concept including e.g. a cam member in the case of the differential mechanism with a limited slip differential mechanism. It is not limited to a general side gear used in an open differential lock but can be widely interpreted.

According to an embodiment of the present invention, a ring member 82 with the boss inserted through, that rotates along with the ring gear or the differential case, has a groove 91 formed in its peripheral edge;

an annular locking member 83 with the boss inserted through and provided with the locking piece; and a fastening spring 92, coiled around the groove of the ring member, that fastens the groove and that is supported with the locking member at its end 93, are provided, and the ring member and the fastening spring slip when beyond a fastening friction.

According to an embodiment of the present invention, the ring member rotates by rotation of the ring gear or the differential case, and at the same time, the locking member rotates. In accordance with increase in the number of revolutions, the fastening spring and the ring member slip and independently move beyond the fastening friction of the fastening spring. With this arrangement, a vehicle speed is increased and the differential lock is prevented while the locking piece is held in a position facing the contact piece (differential lock regulated status).

According to an embodiment of the present invention, a return spring 90 is provided with one end supported with the ring member and with other end supported with the annular member provided with the lock pin, that applies a pressing force in an opposite direction to a direction of rotation of the ring member. A play (e.g. a long hole 87 in the embodiment) is provided to allow rotation within a predetermined range between the boss and the ring member.

According to an embodiment of the present invention, when the vehicle is stopped, only the ring member and the locking member are rotated with the return spring, and the differential lock regulated status can be released.

According to an embodiment of the present invention, the differential gear has a final reduction gear case (e.g. a housing 33 in the embodiment) forming an outer wall surface. When the locking piece is moved to a position facing the contact piece, a case side contact member (e.g. a case side contact piece 86 in the embodiment) contact-holds the locking piece in the inner wall of the final reduction gear case.

According to an embodiment of the present invention, the locking piece can be contact-held in a status where the locking piece has been moved to the position facing the contact piece.

According to an embodiment of the present invention, the entry into a differential lock status during operation can be prevented. Further, as it is a simple mechanism, a cost reduction, and the manufacture of a compact mechanism with a reduction in weight can be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
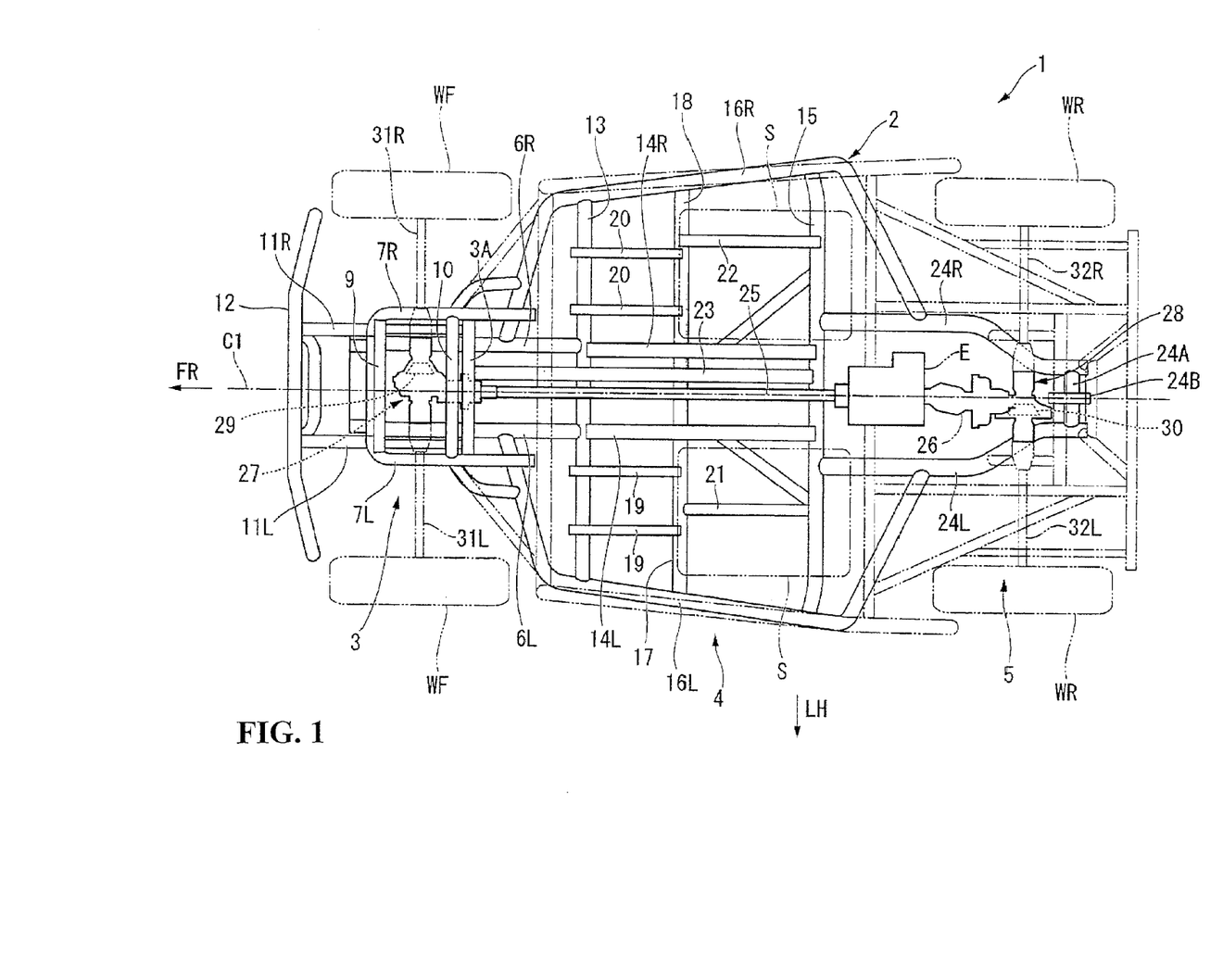
FIG. 1 is a plan view showing a schematic structure of a vehicle according to an embodiment of the present invention.

Hereinbelow, an embodiment of the present invention will be described based on the drawings. FIG. 1 is a plan view showing a schematic structure of a vehicle 1 having a differential gear according to the present invention. In the drawings used in the following description, an arrow FR indicating a vehicle frontward direction, an arrow LH indicating a vehicle leftward direction are presented in appropriate positions. In the following description, these directions are appropriately used. Further, in the drawings, reference sign C1 denotes a center line in a vehicle width direction of the vehicle 1.

The vehicle 1 having the differential gear according to the present invention shown in FIG. 1, which is a comparatively small vehicle having a main purpose of operating on uneven land, has a vehicle body frame 2 forming a basic frame of the vehicle. The vehicle body frame 2 is composed of a front frame 3 holding front wheels WF, a center frame 4 provided in the rear of the front frame 3, forming a space where a seat S on which an occupant is seated and the like is provided, and a rear frame 5 provided in the rear of the center frame 4, holding rear wheels WR and carrying an engine E.

The front frame 3 has a pair of left and right front lower frames 6L and 6R extending in a longitudinal direction in a lower front part of the vehicle, and a pair of left and right front upper frames 7L and 7R rising upward from front ends of the front lower frames 6L and 6R, then being bent, and extending rearwardly and upwardly. A first subcross frame 9 is provided below and between the front upper frames 7L and 7R, and a second subcross frame 10 is provided above and between the front upper frames 7L and 7R.

A pair of left and right bumper support pipes 11L and 11R is provided in front of the front lower frames 6L and 6R, and a bumper 12 extending leftward and rightward is fixed to front ends of the bumper support pipes 11L and 11R. Further, a plurality of inverted frames (not shown) as reinforcing members are provided between the front lower frames 6L and 6R and the front upper frames 7L and 7R. A plurality of cross frames extending leftward and rightward are provided in appropriate positions of such inverted frames. A front subcross frame 3A is provided on the inverted frame that is not illustrated.

The center frame 4 has a first lower cross frame 13 connected to rear ends of the front lower frames 6L and 6R, extending in the vehicle width direction, a pair of left and right center lower frames 14L and 14R extending rearwardly from approximately central region of the first lower cross frame 13, a second lower cross frame 15 connected to rear ends of the center lower frames 14L and 14R, extending in the vehicle width direction, and a pair of left and right side frames 16L and 16R connected to both ends of the first lower cross frame 13 and the second lower cross frame 15, extending in the vehicle longitudinal direction. The side frames 16L and 16R are bent inwardly in the vehicle width direction from a connection position with the first lower cross frame 13, with their front ends connected to the front lower frames 6L and 6R of the front frame 3. Further, the rear ends of the side frames 16L and 16R are bent inwardly in the vehicle width direction from a connection position with the second lower cross frame 15, and connected to rear lower frames 24L and 24R to be describe later.

The center lower frames 14L and 14R are provided in positions offset by a predetermined distance from a vehicle center line C1 in the vehicle width direction, and respectively provided in left and right positions at equal distances from the vehicle center line C1. A left subcross frame 17 and a right subcross frame 18 are provided between the center lower frame 14L and the side frame 16L and between the center lower frame 14R and the side frame 16R. These left subcross frame 17 and right subcross frame 18 are positioned in the approximate middle between the first lower cross frame 13 and the second lower cross frame 15.

Subframes 19, 19 as reinforcing members extending in the vehicle longitudinal direction are arrayed in the vehicle width direction between the left subcross frame 17 and the first lower cross frame 13. Subframes 20, 20 as reinforcing members extending in the vehicle longitudinal direction are arrayed in the vehicle width direction between the right subcross frame 18 and the first lower cross frame 13. Further, a subframe 21 as a reinforcing member extending in the vehicle longitudinal direction is provided between the left subcross frame 17 and the second lower cross frame 15, and a subframe 22 as a reinforcing member extending in the vehicle longitudinal direction is provided between the right subcross frame 18 and the second lower cross frame 15. The seats S are provided over the left subcross frame 17, the second lower cross frame 15 and the subframe 21, and the right subcross frame 18, the second lower cross frame 15 and the subframe 22, and arrayed in the vehicle width direction.

Further, a center frame 23 extending toward a vehicle front part is connected to an approximately central region of the second lower cross frame 15, and a front end of the center frame 23 is connected to a front cross frame 3A of the front frame 3. The center frame 23 extends straight toward the vehicle front part between the center lower frame 14R and the vehicle center line C1 in the vehicle width direction, that is, the center frame 23 is offset to the right side by a predetermined distance from the vehicle center line C1.

The rear frame 5 has a pair of left and right rear lower frames 24L and 24R extending rearwardly from the approximately central region of second lower cross frame 15, and a plurality of cross frames (not illustrated) provided on these frames. The rear lower frames 24L and 24R are bent so as to reduce a mutual distance toward a vehicle rear part, and their rear ends are connected with a rear cross member 24A. The rear cross member 24A is provided with a trailer hitch 24B, with its longer direction along the vehicle center line C1, extending to the front and to the rear.

The engine E, which is a water-cooled engine, is mounted in a so-called longitudinal status above the rear lower frames 24L and 24R in the rear of the seat S. A front propeller shaft 25 for transmission of a driving force extends to the front in a front part of a crankcase (not illustrated) of the engine E, and in the rear part, a rear propeller shaft 26 extends to the rear.

The front propeller shaft 25 extends straight above the vehicle center line C1 between the seats S, and connected to a front final assembly 27, as a final reduction gear for the front wheels, provided on the front frame 3. The rear propeller shaft 26, with its length set to be comparatively short, extends left to the rear from a position above the vehicle center line C1, and is connected to a rear final assembly 28, as a final reduction gear for the rear wheels, provided on the rear frame 5.

The rear propeller shaft 26 is configured to extend left to the rear by providing a universal joint or the like between the engine E and the rear final assembly 28. The rear end of the rear final assembly 28 connected to the rear propeller shaft 26 extends to the rear near the rear cross member 24A, and the rear cross member 24A is provided with the trailer hitch 24B extending to the front along the vehicle center line C1. Accordingly, in the vehicle 1 in the present embodiment, the rear propeller shaft 26 extends left to the rear, and the rear final assembly 28 is biased (offset) leftward from the vehicle center line C1, so as to avoid interference between the rear final assembly 28 and the trailer hitch 24B. That is, the rear final assembly 28 is biased so as to be overlaid on a left part of the trailer hitch 24B in a side view.

The front final assembly 27 includes a front-wheel differential gear 29, and the rear final assembly 28 includes a rear-wheel differential gear 30. One end of the front axles 31L and 31R extending to the left and to the right directions are connected to the front-wheel differential gear 29, and one end of the rear axles 32L and 32R extending to the left and to the right directions are connected to the rear-wheel differential gear 30. The pair of left and right front wheels WF is attached to the other ends of the front axles 31L and 31R, and the pair of left and right rear wheels WR are attached to the other ends of the rear axles 32L and 32R. In this structure, power from the engine E is transmitted to the front wheels WF in the order of "front propeller shaft 25," "front-wheel differential gear 29" and "front axles 31L and 31R," and transmitted to the rear wheels WR in the order of "rear propeller shaft 26," "rear-wheel differential gear 30" and "rear axles 32L and 32R."

Figure 2:
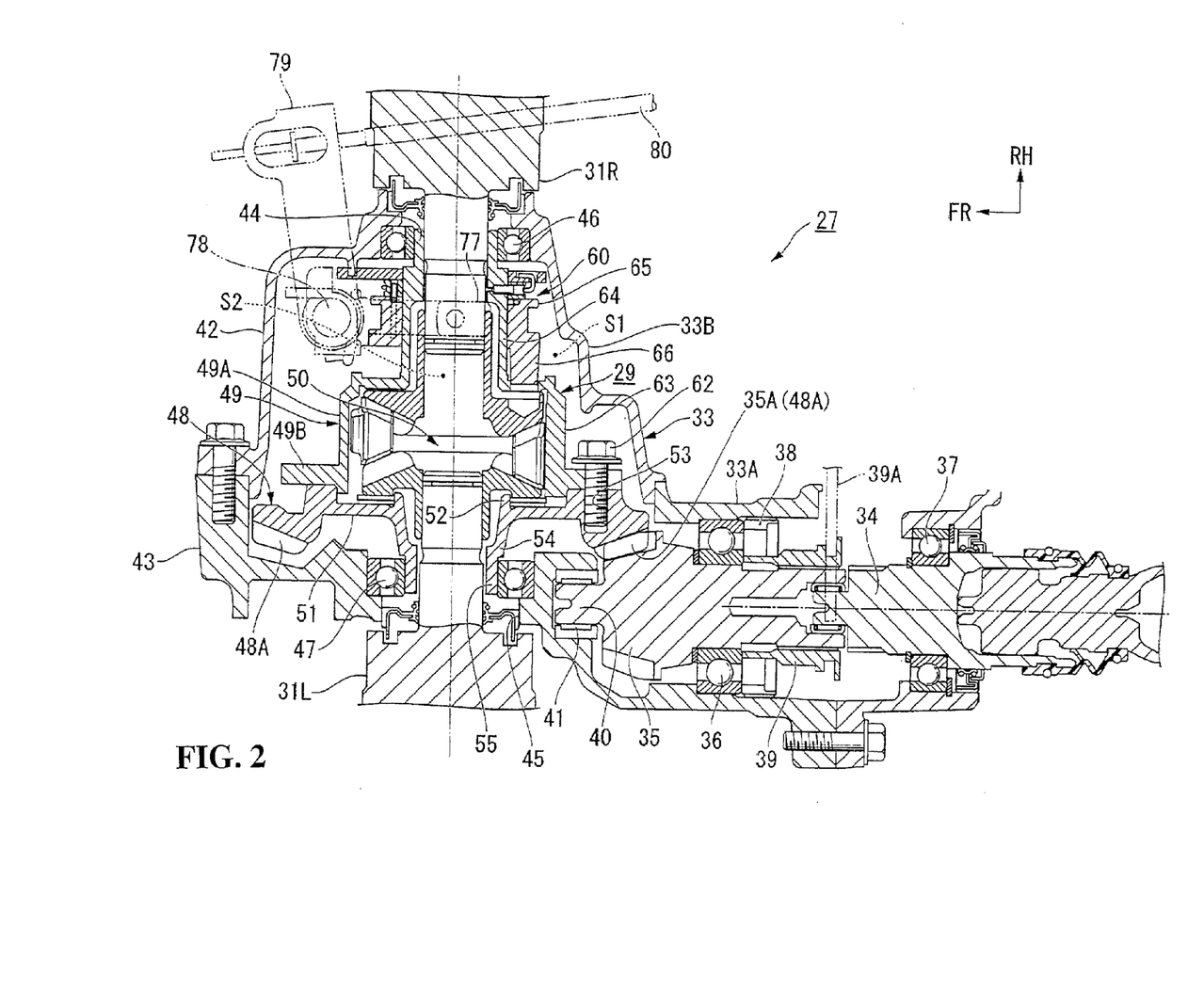
FIG. 2 is a cross-sectional view of a differential gear according to the embodiment of the present invention.

FIG. 2 shows a cross section of a peripheral part of the front final assembly 27 including the front-wheel differential gear 29. As shown in FIG. 2, the front-wheel differential gear 29 is accommodated in a case of the front final assembly 27. Hereinbelow, the front-wheel differential gear 29 to which the present invention is applied will be described in detail.

The case of the front final assembly 27 including the front-wheel differential gear 29 will be described. The front final assembly 27 has a housing 33 to accommodate the front-wheel differential gear 29. The housing 33 is composed of a cylindrical case 33A positioned on the vehicle rear side, and a differential gear case main body 33B positioned on the vehicle front side.

The cylindrical case 33A, with its axial direction along the vehicle center line C1, accommodates a pinion gear 35 connected via a joint 34 to a front end of the front propeller shaft 25. The bearings 36 and 37 are fitted inside a front part and inside a rear part of the cylindrical case 33A, and the pinion gear 35 and the joint 34 are rotatably supported with these bearings 36 and 37 in the cylindrical case 33A. A lock nut 38 is provided in the rear of the bearing 36, and the bearing 36 is fixed to a predetermined position with the lock nut 38.

A cylindrical end 40 projects and is provided at the head of the pinion gear 35, and the end 40 is inserted through and rotatably supported with a bearing 41 fitted in a punch hole formed in the differential gear case main body 33B. A sleeve 39 is provided at the rear base end of the pinion gear 35 movably in an axial direction (longitudinal direction). A lever 39A is engaged with the sleeve 39, and the lever 39A moves the sleeve 39 in the axial direction thereby engages/disengages the sleeve 39 with/from the joint 34. With this arrangement, in the vehicle 1, switching can be made between four-wheel drive and two-wheel drive.

The cylindrical case 33A and the differential gear case main body 33B internally communicate with each other, and a part of a bevel engagement portion 35A of the pinion gear 35 is facing accommodation space S1 formed with the differential gear case main body 33B. The differential gear case main body 33B is divided into a cup-shaped right half member 42 forming a right side part and a left half member 43 forming a left side part and closing an opening of the right half member 42. The above-described accommodation space S1 is formed in cooperation between these right half member 42 and left half member 43.

In the differential gear case main body 33B, the right half member 42 has a shape with its diameter reduced toward the direction to the right, and an opening 44 is formed in its right side end. On the other hand, an opening 45 is formed in a left side end of the left half member 43. The openings 44 and 45 are respectively for insertion of front axles 31R and 31L through, and the front axles 31R and 31L inserted through the differential gear case main body 33B are connected to the front-wheel differential gear 29 through the openings 44 and 45.

Bearings 46 and 47 with their centers along axial line directions of the openings 44 and 45 are provided inside the opening 44 of the right half member 42 and inside the opening 45 of the left half member 43. These bearings 46 and 47 support the front-wheel differential gear 29 rotatably in the differential case main body 33B. The bearings 46 and 47 are respectively fitted inside the right half member 42 and inside the left half member 43. Inner diameters of the bearings 46 and 47 are greater than outer diameters of the front axles 31R and 31L, and the front axles 31R and 31L passed through the openings 44 and 45 reach the front-wheel differential gear 29 via the bearings 46 and 47.

In the present embodiment, the front-wheel differential gear 29 is a differential gear having a limited slip differential mechanism (LSD: limited Slip Differential). As described above, the front-wheel differential gear 29 is accommodated in the differential gear case main body 33B, and rotatably supported with the differential gear case main body 33B.

The front-wheel differential gear 29 has a ring gear 48 engaged with the pinion gear 35 provided on the front propeller shaft 25, a differential case 49 attached to a side surface of the ring gear 48, forming fixed space, and a differential mechanism section 50 accommodated in the differential case 49. The differential mechanism section 50 substantially forms a differential mechanism to absorb a difference in the number of revolutions between left and right driving wheels and allocate driving torque to the respective driving wheels while generating numbers of revolutions corresponding to the respective wheels.

The ring gear 48 has a disc-like ring gear main body 51, and an insertion hole 52 for inserting the front axle 31L or the like is formed in an appropriately central region of the ring gear main body 51. An engagement member 48A engaged with the pinion gear 35 is formed on the outer peripheral edge side of the ring gear main body 51. When the engagement member is engaged with the pinion gear 35, power transmission is performed.

Differential case attachment holes 53 . . . are formed through a side surface of the ring gear main body 51 on the inner side from the engagement member 48A in leftward and rightward direction. The differential case attachment holes 53 . . . are formed in a plurality of positions at predetermined intervals in a circumferential direction of the ring gear main body 51. The differential case 49 is attached via the differential case attachment holes 53 . . . to the ring gear 48.

Further, a cylindrical boss 54 extending to the left in the vehicle width direction is integrally formed with the peripheral edge of the insertion hole 52 of the ring gear 48. The end side (left end side) of the boss 54 is set as a journal member 55 fitted to the bearing 47 provided inside the opening 45 of the left half member 43.

The differential case 49 having a hat-shaped cross section has a cylindrically-formed differential case main body 49A and a flange 49B formed to expand in radial direction from an end peripheral edge of the differential case main body 49A. A bolt insertion hole for attachment to the ring gear 48 is formed in the flange 49B, and the bolt insertion hole is formed in a plurality of positions at predetermined intervals in the circumferential direction of the flange 49B. The differential case 49 is attached to the ring gear 48 by allowing the bolt insertion holes to over lap with the differential case attachment holes 53 . . . , and fastening bolts 62.

The differential case main body 49A is composed of a cylindrical accommodation member 63 accommodating a large part of the differential mechanism section 50 and a cylindrical boss 64 projecting from an head inner region (upon reference to the drawing, a right side end surface) of the accommodation member 63, and integrated with the accommodation member 63. The boss 64 is fitted to the bearing 46 provided inside the opening 44 of the right half member 42, and the front axle 31R is inserted in the cylindrical body of the boss.

The ring gear 48 and the differential case 49 are connected thereby accommodation space S2 is formed. The differential mechanism section 50 is accommodated in the accommodation space S2. Further, the boss 64 of the differential case 49 is provided with a differential lock denoted by sign 60 in the drawing, to stop the differential operation of the differential mechanism section 50. The differential lock 60 is composed of an annular member 65 through which the boss 64 is inserted and a lock pin 66 provided on the annular member 65, and the like.

Figure 3:
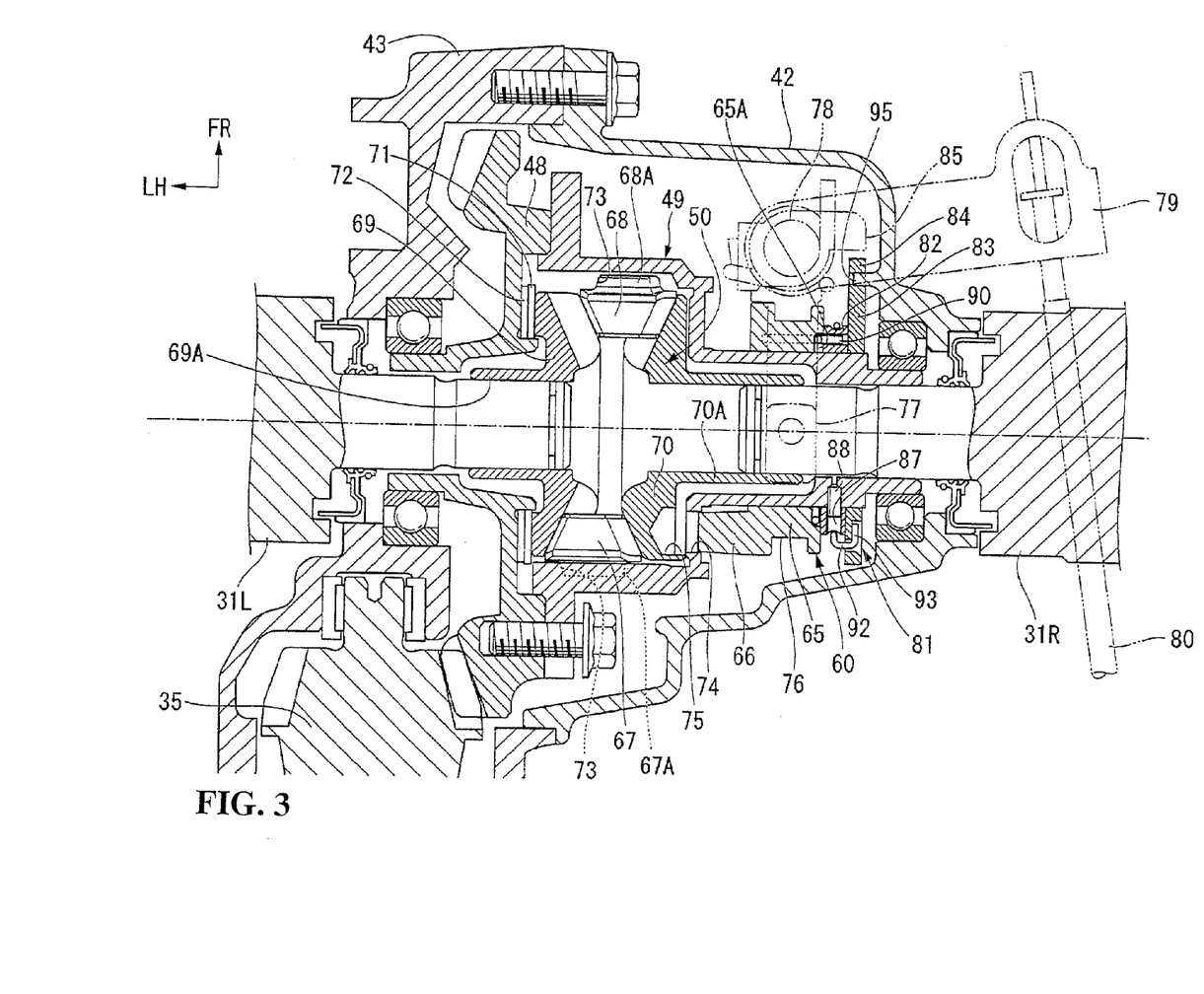
FIG. 3 is a principal-part enlarged cross-sectional view in FIG. 2.

Referring to FIG. 3 to explain the differential mechanism section 50, the differential mechanism section 50 has two types of input side blocks 67 . . . and 68 . . . , integrally rotating with the differential case 49, left and right output side cams 69 and 70 which hold these input side blocks 67 . . . and 68 . . . relatively slidably and which are independently rotatable by friction forces with the respective blocks 67 . . . and 68 . . . . A thrust washer 71 is provided adjacently to the left output side cam 69 with a disc spring 72 provided adjacent to the thrust washer 71.

The left output side cam 69 is provided via the thrust washer 71 and the disc spring 72 on the inner surface side of the ring gear 48, and the input side blocks 67 . . . and 68 . . . are arrayed in the circumferential direction of the differential case 49 so as to be in contact with the left output side cam 69. The right output side cam 70 is provided in the differential case 49 so as to be in contact with the input side blocks 67 . . . and 68 . . . .

The input side blocks 67 . . . and 68 . . . respectively have projecting members 67A and 68A, and are integrally rotatable with the differential case 49 by respectively fitting the projecting members 67A and 68A into grooves 73 . . . formed in a plurality of positions in an inner peripheral surface direction of the differential case 49. Further, the input side blocks 67 . . . and 68 . . . are movable in an axial direction of the differential case 49. Further, the left and right output side cams 69 and 70, having cylindrical members 69A and 70A respectively projecting to the left and to the right, transmit a driving force to the front wheels WF by spline-fitting the front axles 31L and 31R to the respective cylindrical members 69A and 70A.

The operation of the differential mechanism section 50 will be described. In the differential mechanism section 50, when no difference occurs in the number of revolutions between the left output side cam 69 and the right output side cam 70, the input side blocks 67 . . . and 68 . . . and the left and right output side cams 69 and 70 do not relatively rotate but integrally rotate. Further, when a difference occurs in moving speeds i.e. the number of revolutions between the left output side cam 69 and the right output side cam 70, the input side blocks 67 . . . and 68 . . . relatively move, i.e., relatively rotate while respectively causing frictional forces with respect to the left and right output side cams 69 and 70. With this arrangement, it is possible to allocate the driving torque to the left and right output side cams 69 and 70 at different predetermined rates in accordance with frictional force direction which changes in correspondence with the relative slip between the input side blocks 67 . . . and 68 . . . and the left and right output side cams 69 and 70 based on the numbers of revolutions of the two left and right output side cams 69 and 70. Accordingly, even when the driving force at a part of the vehicle wheels is small due to a change in the road friction coefficient, the driving forces of the other vehicle wheels are not lowered, and the total driving force can be ensured. Further, a slip occurs independently at the respective input side blocks 67 . . . and 68 . . . and the left output side cam 69, and the input side blocks 67 . . . and 68 . . . , and the left output side block 70. However, the differential at the left and right wheels are regulated by the frictional force upon slip.

Next, the differential lock 60 will be described. The differential lock 60 slides the annular member 65 in an axial direction of the boss 64, thereby inserts the lock pin 66 through a pin hole 74 formed in the ring gear 48 to a pin hole 75 formed in the right output side cam 70, to stop the above-described differential operation of the differential mechanism section 50.

Figure 4:
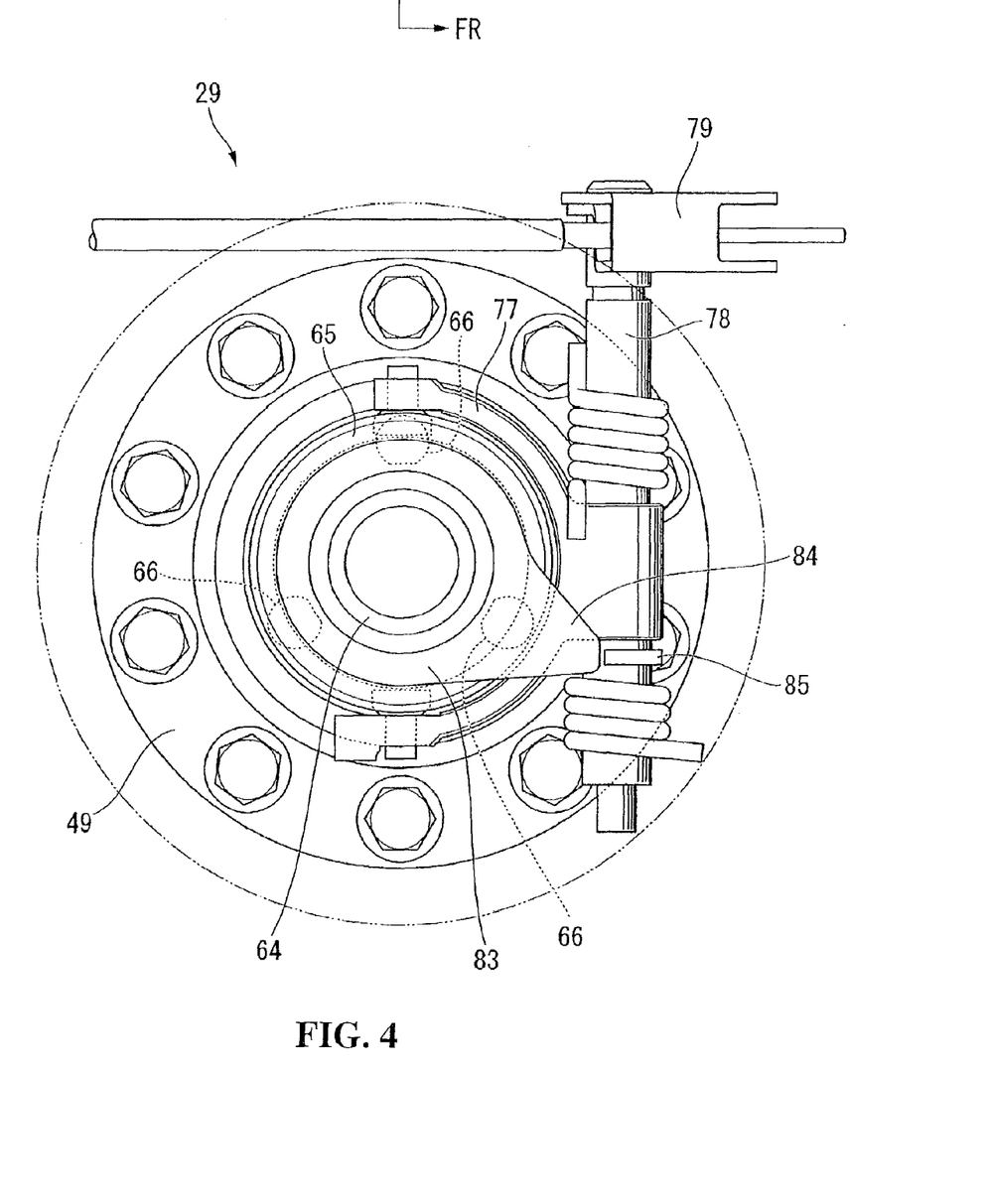
FIG. 4 is a right elevation of the differential gear.

In the differential lock 60, the lock pin 66 is integrally provided with an end surface of the annular member 65 on the ring gear 48 side. As shown in FIG. 4, the lock pin is formed in three positions at 120 degree intervals in a circumferential direction of the annular member 65. The pin hole 74 of the ring gear 48 and the pin hole 75 of the right output side cam 70 are also formed in three positions at 120 degree intervals in the respective circumferential directions in correspondence with the lock pins 66.

An engagement groove 76 is formed in the entire periphery of a peripheral surface (peripheral region) of the annular member 65. A fork member 77 to move the annular member 65 is engaged with the engagement groove 76. As shown in FIG. 4, the fork member 77 is formed in an approximate U-shape and bifurcated, and engaged with the engagement groove 76, with the annular member 65 between its both ends.

The fork member 77 is connected with a lever shaft 78 at an end opposite to the side engaged with the engagement groove 76, in other words, at the bottom of the U shape. As illustrated in e.g. FIG. 3, the lever shaft 78 is provided in front of the boss 64. The lever shaft 78 extends in a vertical direction, with its upper end facing the outside from the right half member 42, and one end of a lever member 79 provided above the right half member 42 to rotate the fork member 77 along with the lever shaft 78, is connected to the upper end of the lever shaft 78 facing the outside from the right half member 42.

A cable 80 is connected to the other end of the lever member 79. The lever member 79 moves the fork member 77 along the axial direction of the boss 64 in correspondence with an occupant's operation (input). The lever member rotates about the lever shaft 78 in correspondence with a push-pull operation of the cable 80 connected to a lever or the like operated by the occupant. With this arrangement, the lever shaft 78 also rotates, the fork member 77 connected to the lever shaft 78 is moved, and the annular member 65 is moved along the boss 64. More specifically, a spring coiled around the lever shaft 78 push-moves the fork member 77 in accordance with the movement of the lever shaft 78. In place of this arrangement, it may be arranged such that the fork member 77 and the lever shaft 78 are connected with a cam groove and a pin engaged with the groove and the like and the fork member 77 is moved.

The operation of the differential lock 60 will be described. In the differential lock 60, the annular member 65 is moved to the left with the fork member 77, the lock pins 66 provided on the annular member 65 are inserted into the pin hole 74 of the ring gear 48 and the pin hole 75 of the right output side cam 70, thereby the right output side cam 70 is integrated with the differential case 49 and the left output side cam 69 rotates along with the ring gear 48. With this arrangement, the left output side cam 69 becomes integrated with the input side blocks 67 . . . and 68 . . . without relative slip. On the other hand, in a status where the differential lock 60 is not actuated, when one of the left and right output side cams 69 and 70 rotates with respect to the input side blocks 67 . . . and 68 . . . , the other one independently rotates in accordance with the rotation. Accordingly, when the right output side cam 70 cannot rotate with respect to the input side blocks 67 . . . and 68 . . . by the actuation of the differential lock 60, as described above, the left output side cam 69 does not rotate. More specifically, the left output side cam 69 rotates integrally with the right output side cam 70 which rotates along with the ring gear 48 and the differential case 49. In other words, the differential mechanism section 50 becomes in a lock status to stop the differential operation, and with this arrangement, the left and right front wheels WF integrally rotate with the same torque. Thus, in the front-wheel differential gear 29 according to the present embodiment, in correspondence with the occupant's operation, the differential lock 60 stops the differential operation of the differential mechanism section 50.

Next, in the present embodiment, the front-wheel differential gear 29 is provided with an inhibitor mechanism denoted by numeral 81 in the drawing which is actuated in correspondence with the operation of the vehicle 1. The inhibitor mechanism 81 prevents the differential lock 60 from entry in the differential lock status during operation of the vehicle 1. In the following description, the details of the inhibitor mechanism 81 will be described.

Referring to FIGS. 3 to 6, the inhibitor mechanism 81 has a ring member 82 through which the boss 64 of the differential case 49 is inserted, and which is adjacent to the annular member 65 and further which rotates along with the differential case 49. An annular locking ring member 83 is provided through which the boss 64 of the differential case 49 is inserted and which is adjacent to the ring member 82, rotatable integrally with the ring member 82, and relatively rotatable with respect to the ring member 82. A locking piece 84 is integrally formed with the locking ring member 83 and projects in an outer diameter direction. Further, the inhibitor mechanism 81 has a contact piece 85 provided in a lower part at the base end side of the fork member 77 that projects in the outer diameter direction of the lever shaft 78, and a case side contact piece 86 indicated with alternate long and two short dashes line in FIG. 5, formed in an inner wall of the right half member 42 of the housing 33 that projects inwardly in the vehicle width direction.

Figure 7:
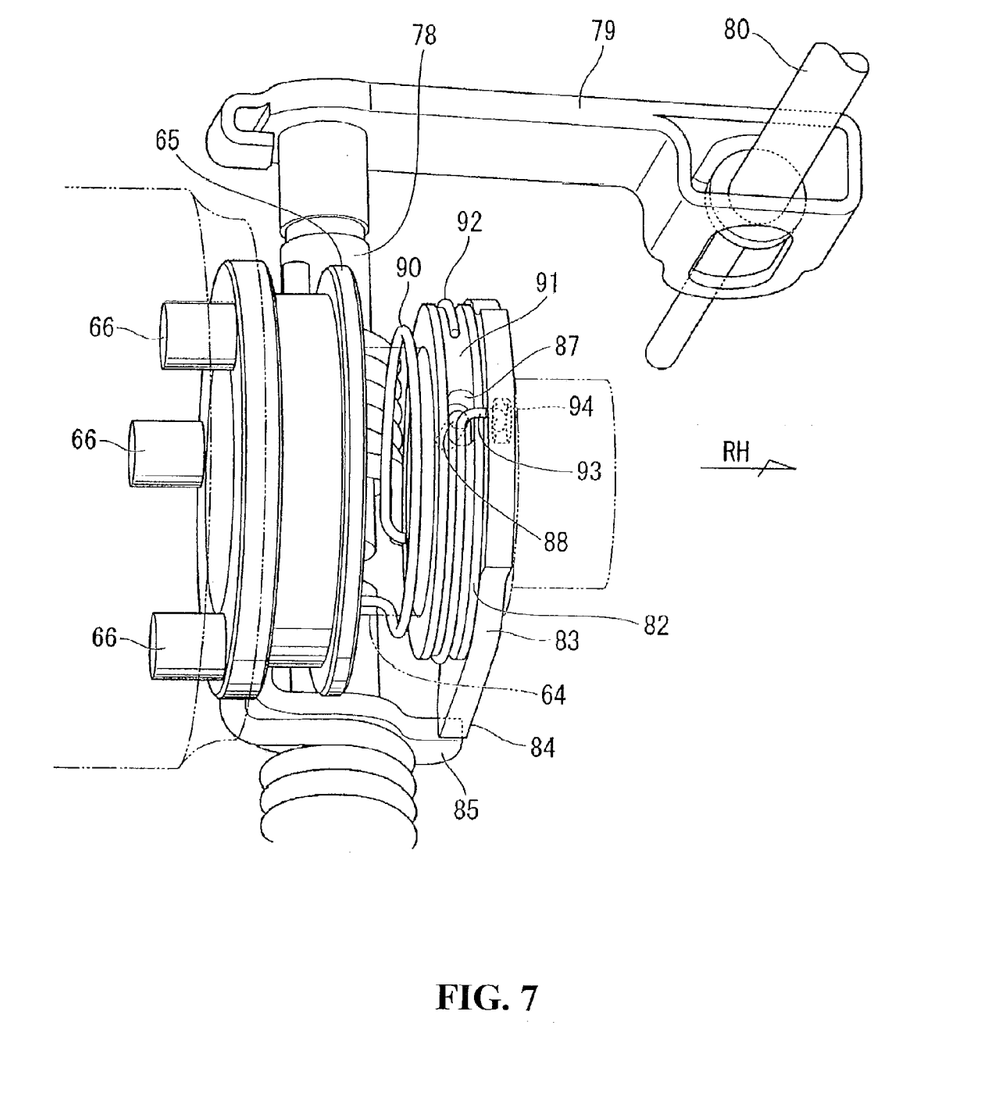
FIG. 7 is an explanatory view of an inhibitor mechanism in the differential gear.

Referring to FIG. 3, the boss 64 is inserted through the ring member 82, in which a long hole 87 is formed through its outer peripheral surface, in a status where a pin 88 projecting from an outer peripheral surface of the boss 64 in the outer diameter direction is inserted through the long hole 87. As shown in FIG. 7, the long hole 87 is formed to be long along the circumferential direction in the ring member 82, i.e., a play allowing rotation within a predetermined range is provided between the boss 64 and the ring member 82. In addition, the ring member 82 is rotatable within a predetermined range in the circumferential direction of the boss 64.

Further, the ring member 82 rotates integrally (interlocked with) the differential case 49 when the pin 88 formed in the boss 64 comes into contact with one end of the long hole 87 upon rotation of the differential case 49. Note that the ring member 82 has an notch (not illustrated) extending from the long hole 87 in an axial direction. When the pin 88 is inserted through the notch to the long hole 87, the ring member is attached to the boss 64.

A return spring 90 as a pressing member is provided between the ring member 82 and the annular member 65. The return spring 90, with one end supported with the ring member 82 while the other end is supported with the annular member 65, is accommodated in a groove 65A formed in an end surface of the annular member 65. In FIG. 7, for the sake of convenience of explanation, the ring member 82 is away from the annular member 65, and the boss 64 is omitted. As shown in FIG. 7, the return spring 90 is provided so as to coil the periphery of the boss 64 along a circumferential direction of the ring member 82, to apply a pressing force to rotation of the ring member 82.

Figure 5:
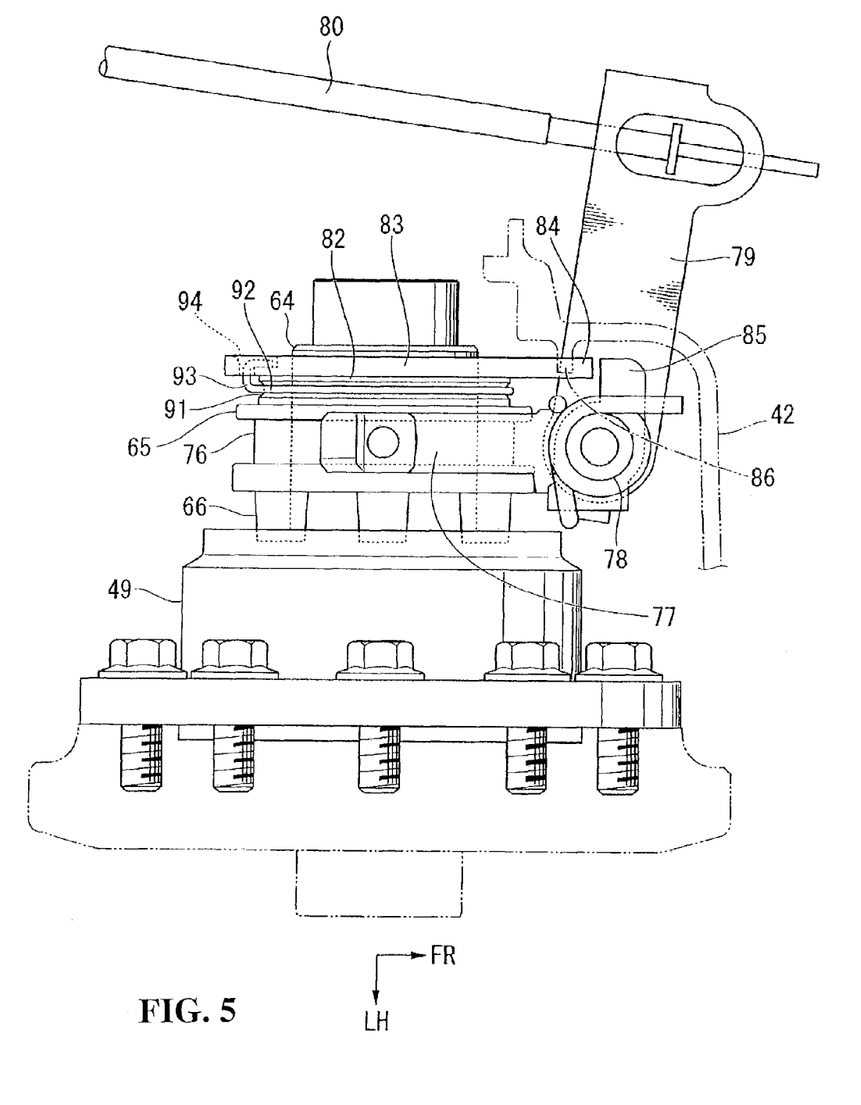
FIG. 5 is a bottom view of a part of the differential gear.
Figure 6:
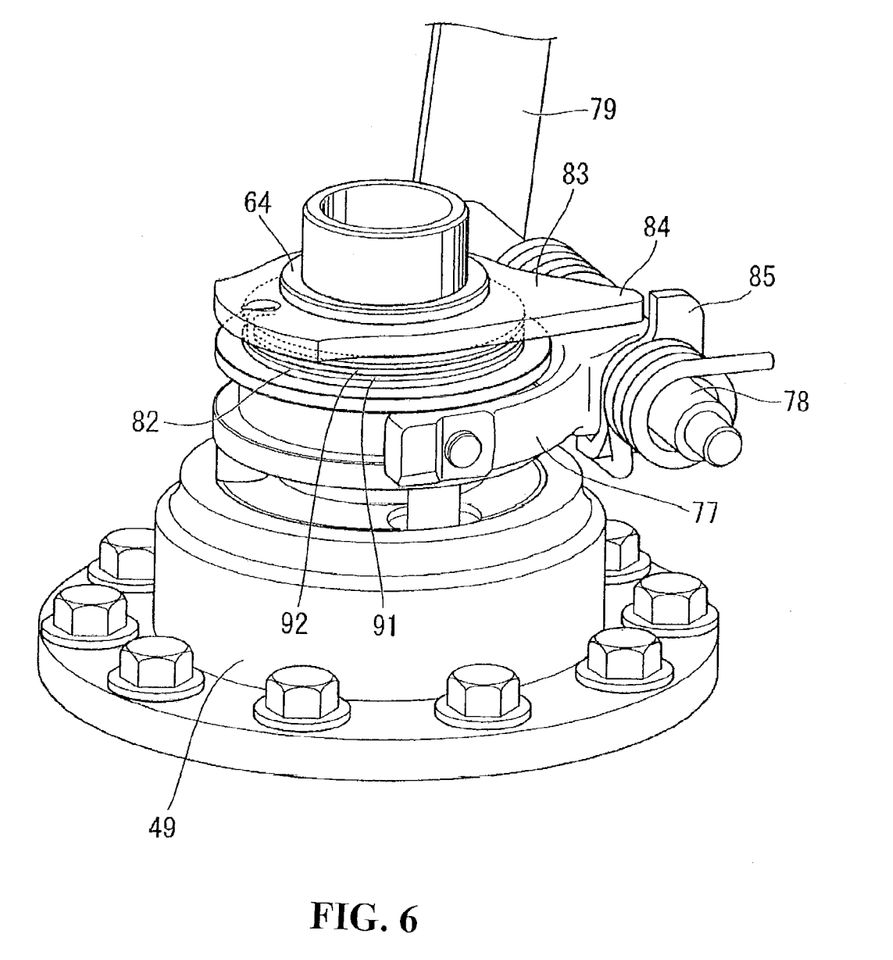
FIG. 6 is a perspective diagram of a part of the differential gear viewed obliquely from behind.

As illustrated in FIGS. 5, 7, a groove 91 is formed in a peripheral edge as an outer peripheral surface of the ring member 82, and a fastening spring 92 is fastened to the groove 91. The fastening spring 92, fastening the groove 91, is fitted to the ring member 82, with an end 93 projecting to the side of the locking ring member 83. The end 93 is engaged with an engagement hole 94 formed in the locking ring member 83.

With this arrangement, the ring member 82 and the locking ring member 83 are connected, the ring member 82 rotates by rotation of the differential case 49 and the locking ring member 83 rotates. Then, when the number of revolutions of the ring member 82 increases, or when the locking ring member 83 is brought into contact and the rotation is regulated, the fastening spring 92 and the ring member 82 slip and independently move beyond a fastening friction of the fastening spring 92.

As well show in FIG. 4, the locking piece 84 formed in the locking ring member 83 projects and is formed so as to extend frontward from a front lower part of the locking ring member 83, and formed in a shape having a side-view triangular shape, with its end extending around the contact piece 85 in a lower part of the fork member 77. The locking piece 84 rotates accompanying the locking ring member 83 when the vehicle 1 starts operating, i.e., when the differential case 49 rotates, and when it reaches the case side contact piece 86 formed in the inner wall of the right half member 42 of the housing 33 and projecting inwardly in the vehicle width direction, comes into contact with it, and is thereby held in a constant attitude and its rotation is regulated.

More specifically, the case side contact piece 86 comes into contact with the locking piece 84 in the locking ring member 83 rotated along with the ring member 82, to rotate the ring member 82 independently of the locking ring member 83. As shown in FIG. 5, it is formed on the lower side of the locking piece 84 and in a rotational orbit of the locking piece 84 about the locking ring member 83 as a shaft center. Note that in FIG. 3, a regulation member 94 is provided for regulation of a rotational range of the locking piece 84, formed in the inner wall of the right half member 42 just above the case side contact piece 86 and projects inward in the vehicle width direction.

Referring to FIGS. 3 to 7, the contact piece 85 of the fork member 77 is formed to extend to the right to a position facing an end of the locking piece 84 held in the constant attitude with the case side contact piece 86, by rotation of the differential case 49. More specifically, the contact piece 85 rotates along with the lever shaft 78 by actuation of the lever member 79. However, the locking piece 84 is held in a constant attitude with the case side contact piece 86 by rotation of the differential case 49 formed in a position where the rotation of the lever shaft 78 is regulated with the locking piece 84. More specifically, the locking piece 84 held in the constant attitude with the case side contact piece 86 by rotation of the differential case 49 is positioned on the rotation orbit of the contact piece 85 when the lever shaft 78 is rotated. Further, in a status where the vehicle 1 is stopped, when the locking piece 84 is moved upward by the pressing force of the above-described return spring 90, the contact piece 85 moves away from the locking piece 84 and the rotation of the lever shaft 78 is allowed.

Figure 8:
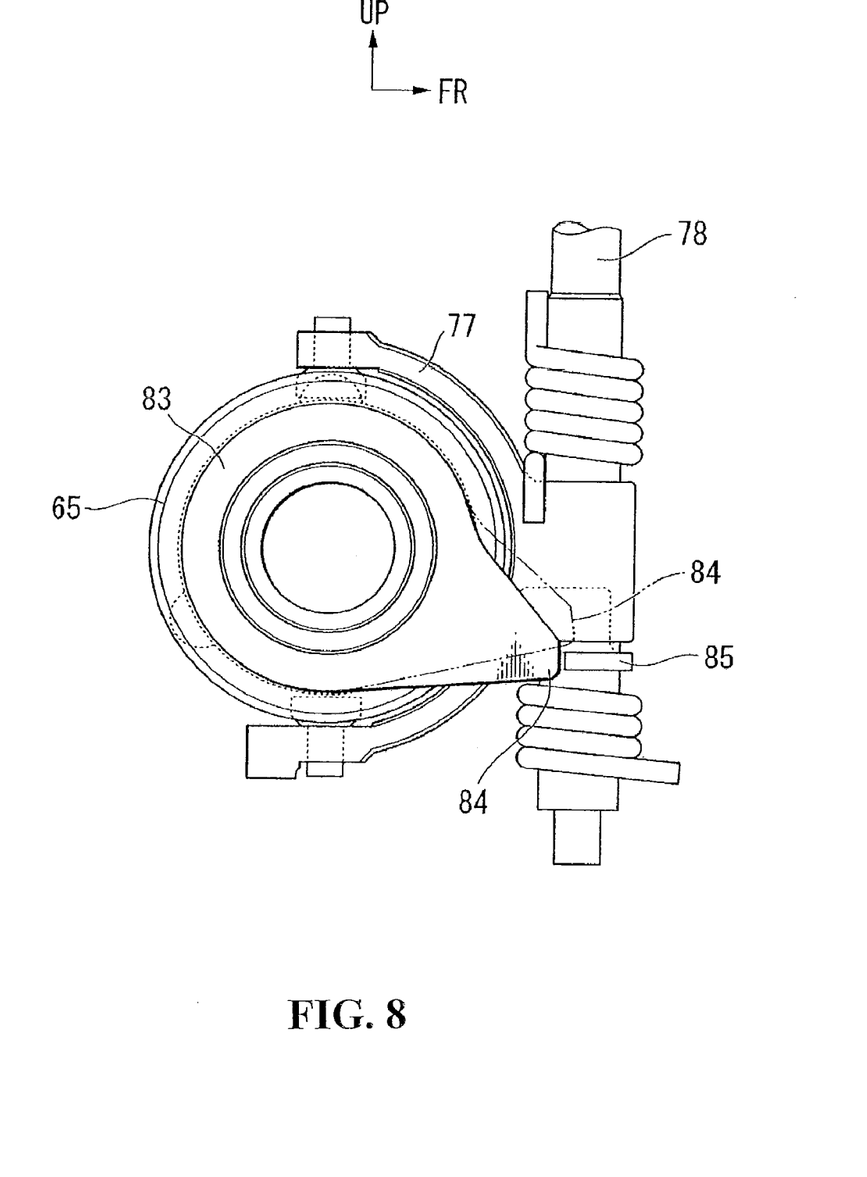
FIG. 8 is an explanatory view of an operation of the inhibitor mechanism in the differential gear.

The operation of the inhibitor mechanism 81 will be described with reference to FIG. 8. In the inhibitor mechanism 81, before the operation of the vehicle, i.e. before the rotation of the differential case 49, as indicated with alternate long and two short dashes line in FIG. 8, the locking piece 84 is positioned away from the case side contact piece 86. Then, when the ring member 82 and the locking ring member 83 rotate along with the rotation of the differential case 49, the locking piece 84 also rotates, to a position in contact with the case side contact piece 86. Then, in the locking ring member 83, as the locking piece 84 is in contact with the case side contact piece 86 (see FIG. 5), the fastening spring 92 and the ring member 82 slip and independently move beyond the fastening friction of the fastening spring 92. More specifically, only the ring member 82 rotates, and the locking ring member 83 and the locking piece 84 are held in constant attitudes. Then, as the locking piece 84 moves to a position facing the contact piece 85 and is held in that attitude, actuation of the fork member 77 is regulated with the contact piece 85. With this arrangement, the entry in the differential lock status during running can be prevented.

On the other hand, when the operation of the vehicle 1 is stops, i.e., when the rotation of the differential case 49 stops, the locking piece 84 is returned along with the locking ring member 83 and the ring member 82 to the position indicated with the alternate long and two short dashes line (because of occurrence of rotational difference) by the pressing force of the return spring 90. With this arrangement, the contact piece 85 moves away from the locking piece 84, the rotation of the lever shaft 78 is allowed, and the differential lock operation by the differential lock 60 is allowed. Thus, in the front-wheel differential gear 29 according to the present embodiment, the differential lock 60 can be prevented with the inhibitor mechanism 81 from entry into the differential lock during operation.

In this manner, in the present embodiment, the locking piece 84 which rotates along with the rotation of the differential case 49 is attached to the differential case 49, and the contact piece 85 contactable with the locking piece 84 is formed in the fork member 77. When the number of revolutions of the differential case 49 is a predetermined number of revolutions, i.e., in the present embodiment, when the vehicle starts operation and the differential case 49 starts rotation, the locking piece 84 moves to the position facing the contact piece 85 to regulate the actuation of the fork member 77, thereby the differential mechanism section 50 does not enter the differential lock status. Accordingly, the entry in the differential lock status during operation can be prevented. Further, in the present embodiment, as the inhibitor mechanism 81 to regulate the differential lock status during operation is constructed with a simple mechanism having mechanical parts, a cost reduction, a manufacture of compact mechanism and a reduction in weight of front-wheel differential gear 29 or the vehicle 1 can be achieved.

Note that the structure in the above-described embodiment is an example of the invention, and various changes can be made in parts and elements, structure, shape, size, number, arrangement and the like, without departing from the subject matter of the invention.

For example, in the present embodiment, the front-wheel differential gear 29 is a differential gear having a limited slip differential mechanism (LSD: Limited Slip Differential). However, the present invention can be preferably applied to a so-called open differential gear i.e. a general differential gear where parts corresponding to the input side blocks 67 . . . and 68 . . . described in the present embodiment are pinion gears, and parts corresponding to the left and right output side cams 69 and 70 are side gears. The present invention is not limited to the format of the differential gear. Further, in the above-described embodiment, the present invention is used in the front-wheel differential gear 29, however, the present invention can be preferably applied to the rear-wheel differential gear 30. The present invention is not limited with use with a front wheel or rear wheel. Further, the present invention can be preferably used in various vehicles such as an all terrain vehicle (ATV).

Figure 9:
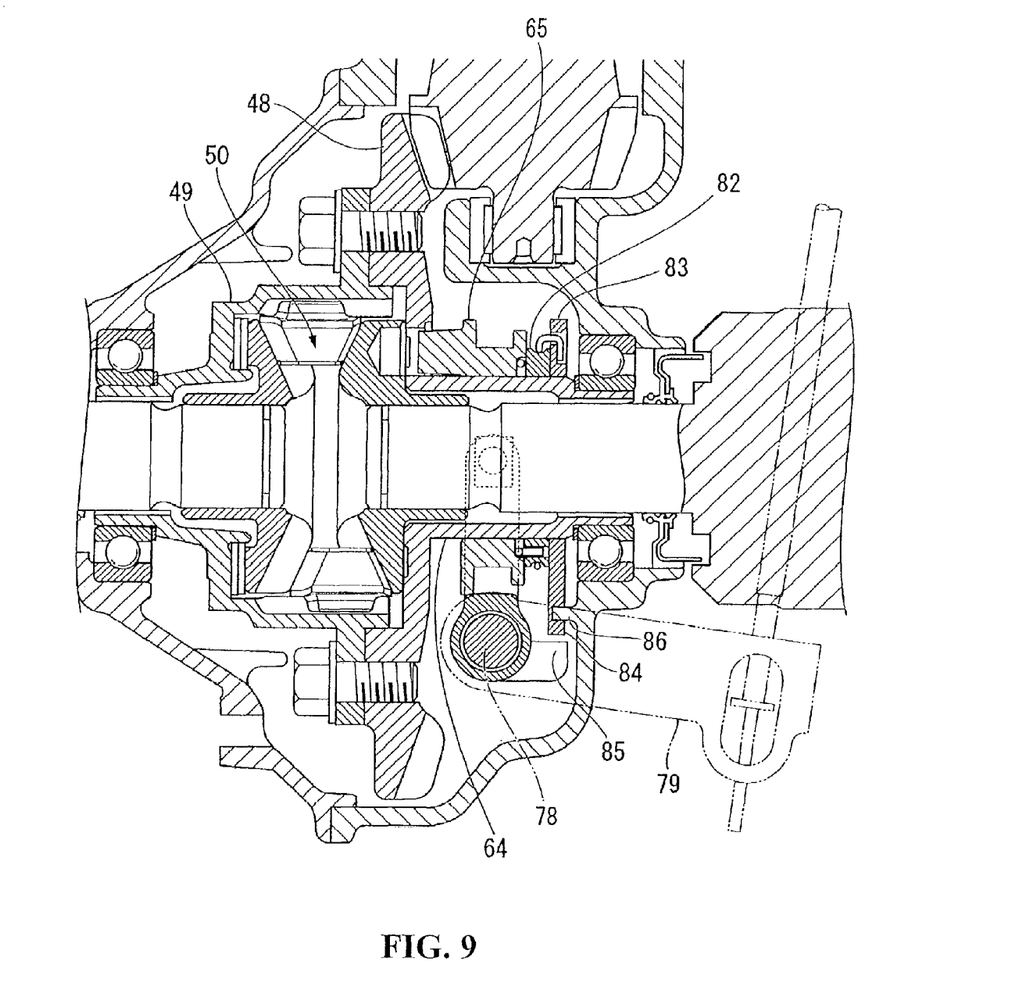
FIG. 9 is a cross-sectional view explaining a modification of the differential gear according to the embodiment of the present invention.

Further, in the present embodiment, examples are explained such that the annular member 65 having the lock pins 66 is provided in the boss 64 formed in the differential case 49, and the ring member 82 and the locking ring member 83 forming the inhibitor mechanism 81 are provided in the boss 64. However, it may be arranged such that a boss corresponding to the boss 64 is formed in the ring gear 48 and inserted through the annular member 65 and the ring member 82 as shown in FIG. 9.

That is, the differential gear shown in FIG. 9 will be described using the same reference signs regarding the same constituent elements as those in the above embodiment. The boss 64 is formed in the ring gear 48, and the differential case 49 is provided on a side surface of the ring gear 48 on the side opposite to the side where the boss 64 is formed, and the differential mechanism section 50 is accommodated in the differential case. The annular member 65 forming the differential lock 60 is provided in the boss 64. The ring member 82, the locking ring member 83, the locking piece 84, the contact piece 85 provided in the fork member 77, the case side contact piece 86 formed in the inner wall of the left half member 43, and the like, are provided adjacently to the annular member 65.

Further, in the present embodiment, the contact piece 85 contactable with the locking piece 84 is formed in the fork member 77. However, the contact piece 85 may be provided in the lever shaft 78.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle differential gear comprising:
a ring gear engaged with a pinion gear provided on a propeller shaft;
a differential case attached to a side surface of the ring gear, forming a differential mechanism chamber;
a differential mechanism accommodated in the differential case;
a side gear engaged with the differential mechanism for transmitting a driving force from the propeller shaft via left and right driven shafts to vehicle wheels;
a lock pin, inserted through the differential case into a pin hole formed in the side gear to stop a differential operation of the differential mechanism to set a differential lock status;
an operation member for operating the lock pin;
a boss integrally formed to insert the driven shaft through the ring gear or the differential case;
an annular member provided in the boss, said annular member being slidable along an axial direction of the boss, and provided with the lock pin therein;
wherein a locking piece that rotates along with rotation of the ring gear or the differential case is attached to the ring gear or the differential case; and
a contact piece contactable with the locking piece is formed in the operation member;
wherein when a number of revolutions of the ring gear or the differential case becomes a predetermined number of revolutions, the locking piece moves to a position facing the contact piece to regulate actuation of the operation member.

2. The vehicle differential gear according to claim 1, and further including a ring member, the boss inserted therethrough, rotates along with the ring gear or the differential case, having a groove formed in its peripheral edge;
an annular locking member wherein the boss is inserted therethrough and is provided with the locking piece; and a fastening spring, coiled around the groove of the ring member, for fastening the groove with the locking member being supported at its end; and
the ring member and the fastening spring slip when beyond a fastening friction.

3. The vehicle differential gear according to claim 2, wherein a return spring, with one end supported with the ring member and with other end supported with the ring member provided with the lock pin, for applying a pressing force in an opposite direction to a direction of rotation of the ring member; and
a play to allow rotation within a predetermined range is provided between the boss and the ring member.

4. The vehicle differential gear according to claim 1, wherein the differential gear has a final reduction gear case forming an outer wall surface; and
in a status where the locking piece is moved to a position facing the contact piece, a case side contact member for contact holding the locking piece is provided in the inner wall of the final reduction gear case.

5. The vehicle differential gear according to claim 2, wherein the differential gear has a final reduction gear case forming an outer wall surface; and
in a status where the locking piece is moved to a position facing the contact piece, a case side contact member for contact holding the locking piece is provided in the inner wall of the final reduction gear case.

6. The vehicle differential gear according to claim 3, wherein the differential gear has a final reduction gear case forming an outer wall surface; and
in a status where the locking piece is moved to a position facing the contact piece, a case side contact member for contact holding the locking piece is provided in the inner wall of the final reduction gear case.

7. The vehicle differential gear according to claim 1, wherein the ring gear has a disc-like main body and an insertion hole adapted for the insertion of an axle, said insertion hole being formed in an approximately central region.

8. The vehicle differential gear according to claim 1, wherein said differential case includes a plurality of attachment holes formed through a side surface of a main body of the ring gear on an inner side from an engagement member, said plurality of attachment holes enabling the differential case to be secured to the ring gear.

9. The vehicle differential gear according to claim 1, wherein a plurality of lock pins are axially movable together with the annular member for being received in a corresponding plurality of holes in the ring gear for providing the differential lock status.

10. The vehicle differential gear according to claim 1, and further in including a fork member operatively connected to a lever shaft, said lever shaft being operatively positioned relative to the boss, a lever member operatively connected to rotate the fork member relative to the lever shaft for moving the annular member along the boss.

11. A vehicle differential gear comprising:
a ring gear adapted to be operatively connected to a pinion gear;
a differential case attached to a side surface of the ring gear, forming a differential mechanism chamber;
a differential mechanism accommodated in the differential case;
a side gear engaged with the differential mechanism for transmitting a driving force;

a lock pin, inserted through the differential case into a pin hole formed in the side gear to stop a differential operation of the differential mechanism to set a differential lock status;

an operation member for operating the lock pin;

a boss integrally formed to insert a driven shaft through the ring gear or the differential case;

an annular member provided in the boss, said annular member being slidable along an axial direction of the boss, and provided with the lock pin therein;

wherein a locking piece that rotates along with rotation of the ring gear or the differential case is attached to the ring gear or the differential case; and a contact piece contactable with the locking piece is formed in the operation member;

wherein when a number of revolutions of the ring gear or the differential case becomes a predetermined number of revolutions, the locking piece moves to a position facing the contact piece to regulate actuation of the operation member.

12. The vehicle differential gear according to claim 11, and further including a ring member, the boss inserted therethrough, rotates along with the ring gear or the differential case, having a groove formed in its peripheral edge;

an annular locking member wherein the boss is inserted therethrough and is provided with the locking piece; and a fastening spring, coiled around the groove of the ring member, for fastening the groove with the locking member being supported at its end; and the ring member and the fastening spring slip when beyond a fastening friction.

13. The vehicle differential gear according to claim 12, wherein a return spring, with one end supported with the ring member and with other end supported with the ring member provided with the lock pin, for applying a pressing force in an opposite direction to a direction of rotation of the ring member; and a play to allow rotation within a predetermined range is provided between the boss and the ring member.

14. The vehicle differential gear according to claim 11, wherein the differential gear has a final reduction gear case forming an outer wall surface; and in a status where the locking piece is moved to a position facing the contact piece, a case side contact member for contact holding the locking piece is provided in the inner wall of the final reduction gear case.

15. The vehicle differential gear according to claim 12, wherein the differential gear has a final reduction gear case forming an outer wall surface; and in a status where the locking piece is moved to a position facing the contact piece, a case side contact member for contact holding the locking piece is provided in the inner wall of the final reduction gear case.

16. The vehicle differential gear according to claim 13, wherein the differential gear has a final reduction gear case forming an outer wall surface; and in a status where the locking piece is moved to a position facing the contact piece, a case side contact member for contact holding the locking piece is provided in the inner wall of the final reduction gear case.

17. The vehicle differential gear according to claim 11, wherein the ring gear has a disc-like main body and an insertion hole adapted for the insertion of an axle, said insertion hole being formed in an approximately central region.

18. The vehicle differential gear according to claim 11, wherein said differential case includes a plurality of attachment holes formed through a side surface of a main body of the ring gear on an inner side from an engagement member, said plurality of attachment holes enabling the differential case to be secured to the ring gear.

19. The vehicle differential gear according to claim 11, wherein a plurality of lock pins are axially movable together with the annular member for being received in a corresponding plurality of holes in the ring gear for providing the differential lock status.

20. The vehicle differential gear according to claim 11, and further in including a fork member operatively connected to a lever shaft, said lever shaft being operatively positioned relative to the boss, a lever member operatively connected to rotate the fork member relative to the lever shaft for moving the annular member along the boss.

* * * * *